(12) United States Patent
Zhang et al.

(10) Patent No.: US 8,204,277 B2
(45) Date of Patent: Jun. 19, 2012

(54) APPARATUS AND METHOD FOR CAMERA-BASES LANE MARKER DETECTION

(75) Inventors: Wende Zhang, Shelby Township, MI (US); Varsha Sadekar, Sterling Heights, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1005 days.

(21) Appl. No.: 12/175,631

(22) Filed: Jul. 18, 2008

(65) Prior Publication Data

US 2010/0014714 A1    Jan. 21, 2010

(51) Int. Cl.
*G06K 9/00* (2006.01)
(52) U.S. Cl. .................................... 382/104; 701/1
(58) Field of Classification Search .............. None
See application file for complete search history.

(56) References Cited

U.S. PATENT DOCUMENTS

| | | | |
|---|---|---|---|
| 5,675,489 A | 10/1997 | Pomerleau | |
| 6,819,779 B1* | 11/2004 | Nichani | 382/104 |
| 7,151,996 B2 | 12/2006 | Stein | |
| 7,876,926 B2* | 1/2011 | Schwartz et al. | 382/104 |
| 2002/0159622 A1* | 10/2002 | Schneider et al. | 382/128 |
| 2004/0042638 A1* | 3/2004 | Iwano | 382/104 |
| 2004/0151356 A1* | 8/2004 | Li et al. | 382/131 |
| 2006/0210116 A1* | 9/2006 | Azuma | 382/104 |
| 2008/0109118 A1* | 5/2008 | Schwartz et al. | 701/1 |
| 2010/0014713 A1* | 1/2010 | Zhang et al. | 382/104 |
| 2010/0014714 A1* | 1/2010 | Zhang et al. | 382/104 |

OTHER PUBLICATIONS

W. Kwon and S. Lee, "Performance Evaluation of Decision Making Strategies for an Embedded Lane Departure Warning System," Journal of Robotic Systems, 19 (10), pp. 499-509, 2002.
D. D. Salvucci, "Inferring Driver Intent: A Case Study in Lane-Change Detection," in Proceedings of the Human Factors Ergonomics Society 48th Annual Meeting, 2004.
J. C. McCall and Mohan Manubhai Trivedi, "Video-Based Lane Estimation and Tracking for Driver Assistance: Survey, Systems, and Evaluation". IEEE Transactions on Intelligent Transportation Systems, 7 (1), pp. 20-37, 2006.
Duda, R. O. and P. E. hart, "Use of the Hough Transformation to Detect Lines and Curves in Pictures", Comm. ACM, vol. 15, pp. 11-15, 1972.

* cited by examiner

*Primary Examiner* — Bhavesh Mehta
*Assistant Examiner* — Tahmina Ansari (57) ABSTRACT

A method is provided for detecting road lane markers in a vehicle road using an imaging device. Road input data is captured using the imaging device. Lighting normalization is applied to the road input data. The method detects the road lane markers in a few main orientations in the normalized input data. In each main orientation, the normalized input data is convolved with an oriented edge detection filter for generating an oriented edge-based filter response. The normalized input data is convolved with an oriented line detection filter for generating an oriented line-based filter response. Candidate lane markers are selected in response to the edge-based filter response and line-based filter response in each main orientation. A transformation technique is applied to the candidate lane markers for identifying the lane markings in each main orientation.

20 Claims, 7 Drawing Sheets

APPARATUS AND METHOD FOR CAMERA-BASES LANE MARKER DETECTION

BACKGROUND OF INVENTION

An embodiment relates generally to lane marker detection of a road using an image-based capture device.

Camera-based lane marker detection systems are used to detect roads or road segments of a vehicle road. Most systems work reasonably well in highway scenarios and cannot handle the complex environment in local scenarios. Such camera-based systems are susceptible to incorrectly distinguishing road objects such as curbs and lane markers from shadows of trees, buildings, and other environmental conditions. Furthermore, camera-based systems are typically challenged by certain conditions such as sharp curves in the road or the weather/low sun angle. Since curves in roads are more difficult to detect in comparison to straight lines, such systems have the disadvantage of running slower processing times to accurately detect the lane markers.

SUMMARY OF INVENTION

An advantage of the invention provides for a low cost and reliable detection of lane markers in a road using an image capture device. The invention provides for the use of a low-cost image capture device such as a camera for detecting lane markers reliably along curved roads or straight roads. The lane markers of the sharp curves are distinguished from distracting factors such as various shadows from buildings and trees in addition to poorly painted lane markers.

An embodiment contemplates a method of detecting road lane markers in a vehicle road using an imaging device. Road input image data is captured using the imaging device. Lighting normalization is applied to the road input image data. The method detects the road lane markers in a few main orientations in the input image. In each main orientation, the normalized input data is convolved with an oriented edge detection filter for generating an oriented edge-based filter response. The normalized input data is convolved with an oriented line detection filter for generating an oriented line-based filter response. Candidate lane markers are selected in response to the edge-based filter response and line-based filter response in the neighboring angles of each main orientation. A transformation technique is applied to the candidate lane markers for identifying the lane markings in the neighboring angles of each main orientation.

An embodiment contemplates a lane marker detection system. An imaging device is provided for capturing road input data. A processor receives the captured road input data received by the imaging device. The processor applies lighting normalization to the road input data. The processor processes the normalized input data in a few main orientations. In each main orientation, the processor convolves the normalized input data with an oriented edge detection filter for generating an oriented edge-based filter response. The processor convolves the normalized input data with an oriented line detection filter for generating an oriented line-based filter response. The processor selects candidate lane markers from the edge-based filter response and the line-based filter response. In each main orientation, the processor applies a transformation technique to the selected candidate lane markers for identifying the line segments of lane markings. An output device is provided for identifying a location of each of the lane markers.

DETAILED DESCRIPTION

Figure 1:
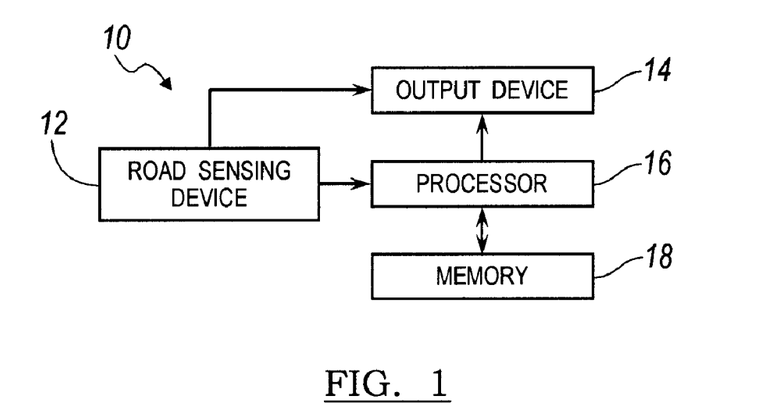
FIG. 1 is a schematic view of an image-based lane marker detection system.

There is shown in FIG. 1 a lane marker detection system 10 for detecting lane markers in a road of the driven vehicle. The lane marker detection system 10 may be used in an autonomous steering system for road detection or the lane marker detection system 10 may be used for driver awareness for a vehicle driven by a driver to enhance visibility during the daytime or nighttime when road or lane marker visibility is poor or during other instances when visibility enhancement is warranted.

The lane marker detection system 10 includes an image capture device 12 including, but not limited to, a camera. The image capture device 12 captures an image of the road, typically the area directed in the front of the vehicle. The captured image is processed for identifying both edges of a lane marker as well as a line (i.e., main body) of the lane marker.

The lane marker detection system 10 further includes a processor 16 for receiving and processing the captured image data by the image capture device 12. A memory storage device 18 may also be provided for storing and retrieving the captured data.

The processor 16 executes a program that filters the captured image data in real time for determining the presence and location of one or more lane markers in the vehicle road. The detected lane markers are provided to an output device 14 such as an autonomous steering module or an image display device. The autonomous steering module may use the processed information for autonomously maintaining vehicle position within the road between the detected lane markers. The image display device which may include, but is not limited to, monitor-type displays, a projection-type imaging, holograph-type imaging, or similar imaging displays may use the processed information for highlighting the lane markers in the image display device for providing visual enhancement of the road to the driver of the vehicle. The term highlighting refers to identifying the location of the lane markers or road segments in the image data and may be performed by any comparable method for identifying the location of the lane markers in the captured image data.

Figure 2:
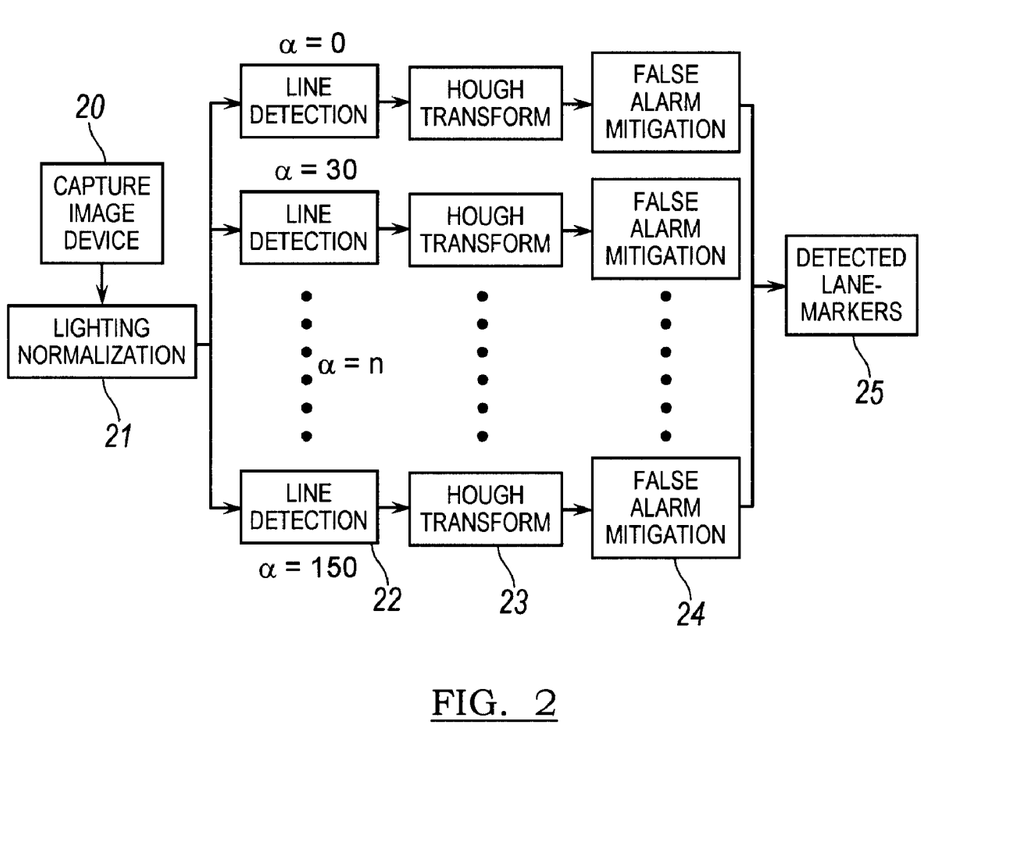
FIG. 2 is a block diagram of a method for detecting lane markers in a road.

FIG. 2 illustrates a block diagram for detecting lane markers from the captured image data. The lane marker detection system 10 uses camera-based sensing techniques. The lane marker detection system 10 applies a parallel processing approach that includes (1) a lighting normalization step, (2) a line detection step, (3) a Hough transformation step, and (4) a false alarm mitigation step.

Figure 3:
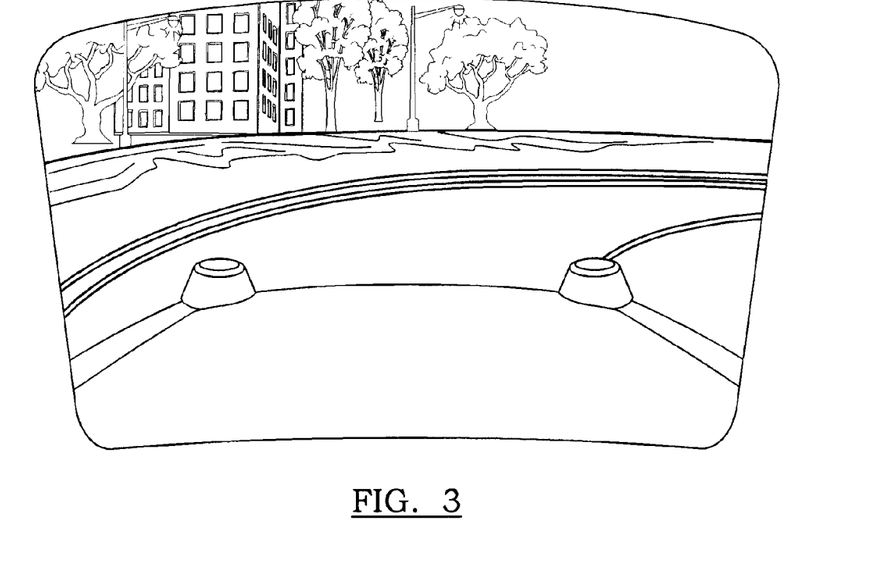
FIG. 3 is a display of a captured image.

In block 20, the image capture device captures an image of a candidate road segment exterior of the vehicle as illustrated in FIG. 3. A region of interest is identified within the captured image. The region of interest of the captured image data is represented by an array of pixels. In block 21, lighting normalization is applied to the captured image data. Normalization is a process which changes the range of pixel intensity values. The purpose of the normalization is to bring the image into a range that is more suitable for machine process to improve the reliability. For example, each pixel value is normalized to be a zero mean and unit variance to enhance the image contrast, specifically in a low lighting environment or when contrast is poor due to glare.

Figure 4:
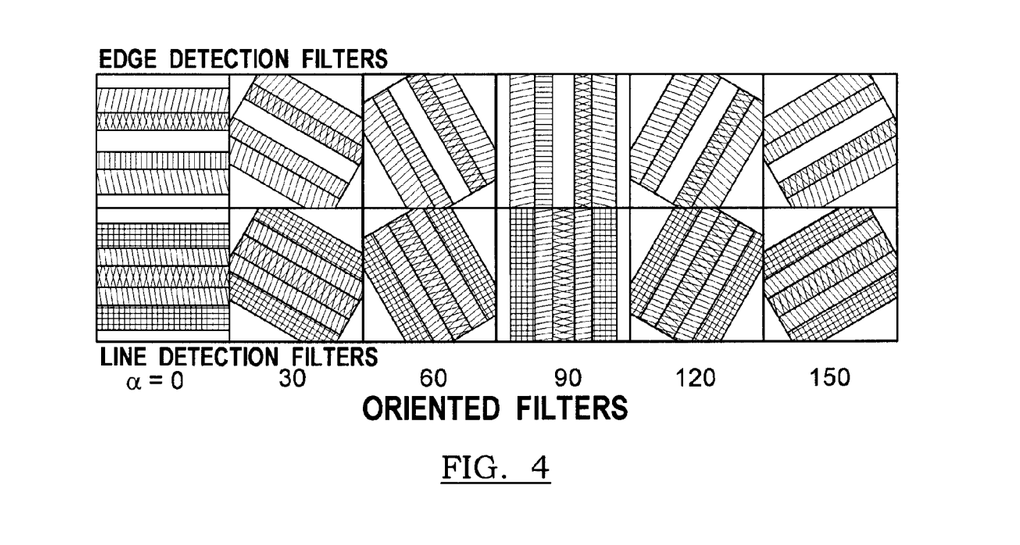
FIG. 4 is an image representation of orientation detection filters.

The normalized captured image data is split into a plurality of parallel processing paths for lane marker detection in a few main orientation angles. In block 22, in each main orientation angle $\alpha$, the normalized captured image data is convolved with an oriented line detection filter with angle $\alpha$ for detecting the lines with the angle close to $\alpha$ (i.e., main body portion) of the lane marker. In addition, the normalized captured image data is convolved with an oriented edge detection filter with angle $\alpha$ for detecting the edges with the angle close to a bordering the line of the lane marker. FIG. 4 illustrates a plurality of oriented line and edge detection filters that may be applied to the normalized captured image data. The oriented line detection filters are oriented at various angles for identifying a respective orientation of the candidate lane markers (e.g., $\alpha=30$, $\alpha=60$, $\alpha=90$ ... $\alpha=150$). For example, the captured image data for a curved lane marker is identified by matching a selective group of oriented filters with the lane marker for identifying respective segments and their respective angle of orientation of the curved lane marker. The curve is detected by piecing together straight lines oriented at different angles. The coupling of the straight lines each oriented at different angles identifies the curvature of the lane marker. That is, for a curved lane marker, a plurality of oriented lane detection filters is applied to segments of the lane marker for generating a filter response that identifies the orientation of each segment of the lane marker. The oriented detection filters described above may be first and second derivatives of Gaussian filters.

Figure 5A:
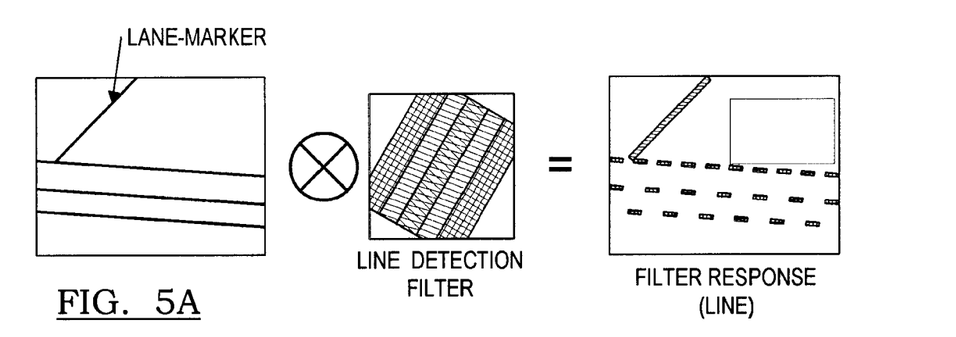
FIG. 5a is an image representation of an oriented line filtering process.
Figure 5B:
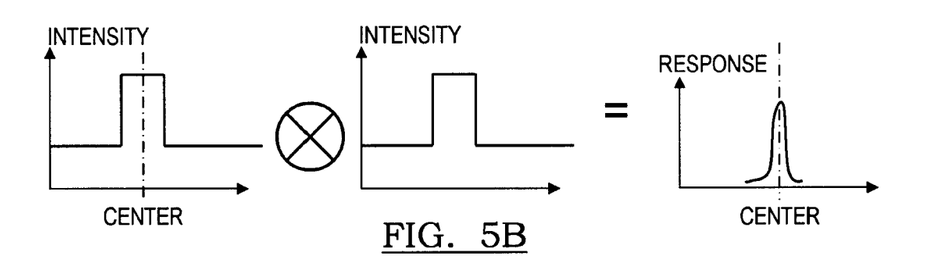
FIG. 5b is a graphical representation of the oriented line filtering process.

FIGS. 5a and 5b show an image representation and a graphical representation, respectively, of a respective oriented line detection filter applied to captured image data for generating a line-based filter response. As shown in the filter response of the image representation in FIG. 5a, a plurality of lines representing potential lane marker candidates are extracted from the filter response.

Figure 6A:
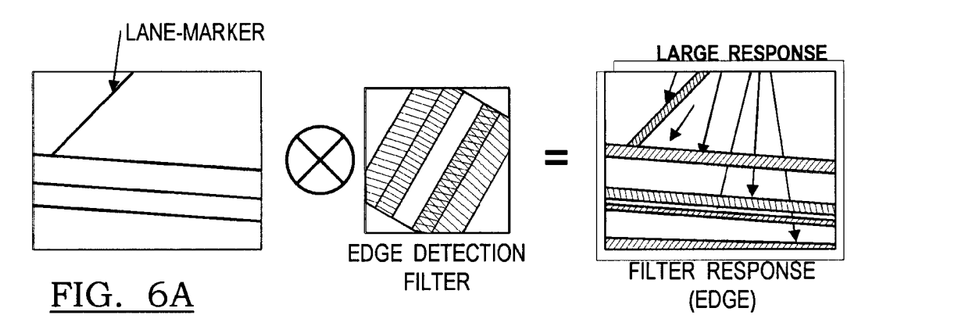
FIG. 6a is an image representation of an oriented edge filtering process.
Figure 6B:
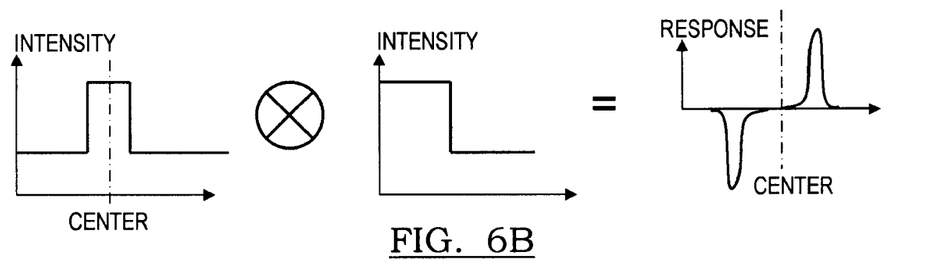
FIG. 6b is a graphical representation of the oriented edge filtering process.

FIGS. 6a and 6b show an image representation and a graphical representation, respectively, of a respective oriented edge detection filter applied to a captured image data for generating an edge-based filter response. The edge-based filter applied to the captured image data enhances the edges for detecting the edges of a respective lane marker by generating a negative response and a positive response as shown the filter response of FIG. 6b. The positive response is identified by the positive peak in the filter response whereas the negative response is identified by the negative peak in the filter response. The positive and negative peaks represent respective edges of the potential lane marker. As shown in the FIG. 6a, a plurality of edges representing potential lane marker candidates are extracted from the filter response.

Figure 7A:
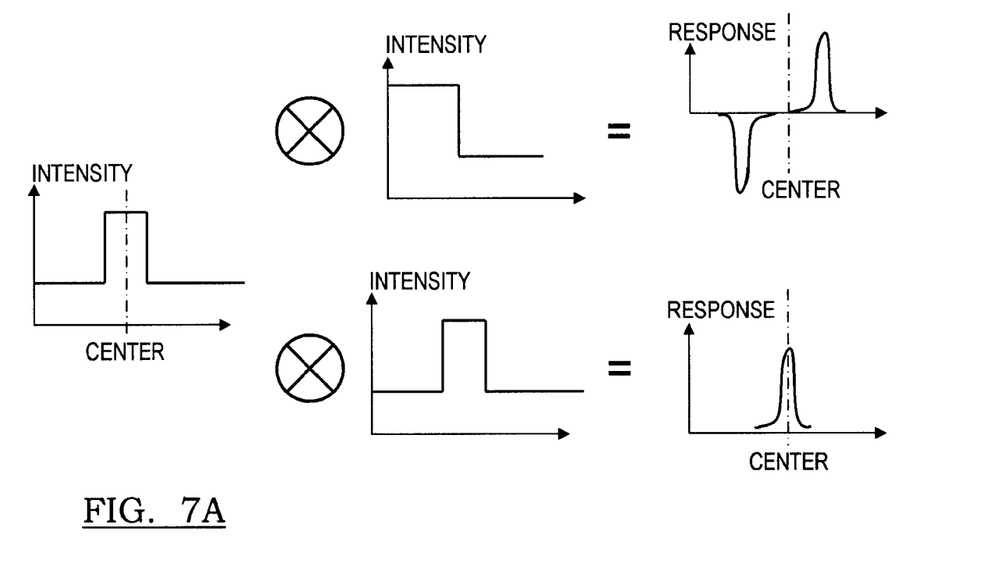
FIG. 7a is a graphical representation of a combined oriented edge and line filtering process.
Figure 7B:
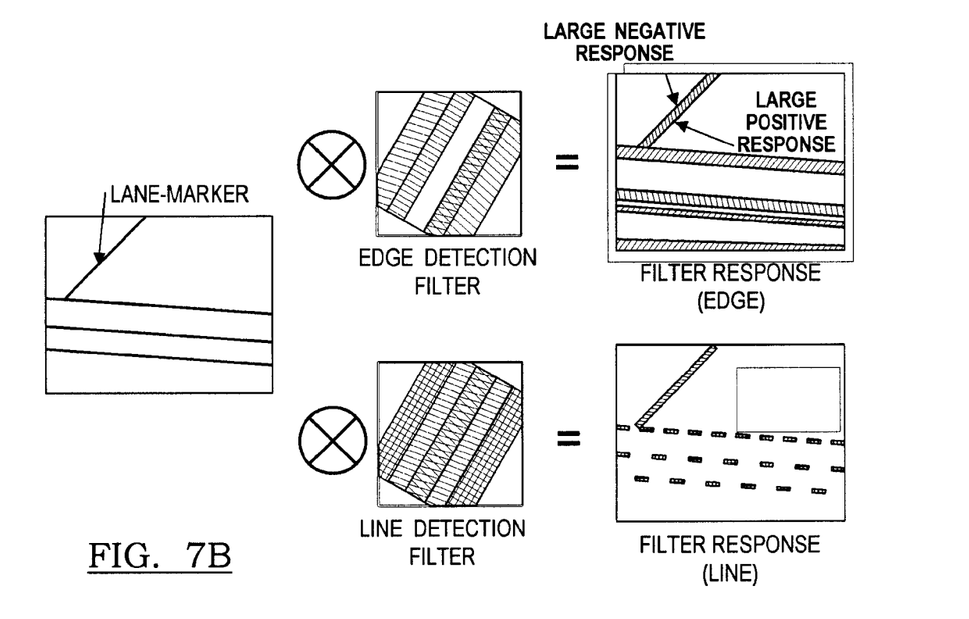
FIG. 7b is an image representation of a combined oriented edge and line filtering process.

FIGS. 7a and 7b show an image representation and a graphical representation, respectively, of a combined edge and line oriented filtering process applied to the normalized captured input data. The graphical representation and the image representation using the oriented edge detection filters and the oriented line detection filters are applied for cooperatively detecting the lines and edges of lane markers in the vehicle road to identify the candidate points of lane markers in image.

In block 23, a Hough transform technique is applied for identifying the line segments of lane markings from the candidate points of lane markers. The Hough transform is a feature extraction technique used to find imperfect instances of objects within the class of shapes of the candidate points being analyzed. The Hough transform is concerned with the identification of lines in the candidate points in image, and more specifically, the identification of the positions and angles of the lines within the candidate points in image. For example, the oriented edge detection filter and line detection filter with an angle $\alpha$ in block 22 are used as a pre-processor to obtain candidate points that are on the desired line with the angle close to a (have large positive line filter responses and large positive and large negative edge filter responses along the perpendicular direction of $\alpha$) in the normalized image. Due to imperfections in the either the oriented edge detection filter, the oriented line detection filter, or the noise in the normalized captured image data, there may be missing pixels on the desired lines/curves or noise generated from the filtering results. Therefore, it is possible to perform groupings of candidate points into the candidate line segments by parameterizing the lines based on the candidate points in image. The Hough transform technique basically determines if there is enough evidence of a line based on the candidate points. If there is enough evidence, the parameters of the line are calculated. The Hough technique parameterizes lines in the Hough domain with two parameters, $\rho$ and $\theta$, where $\rho$ represents the distance between the line and the origin, and $\theta$ is the angle of the line. Using this parameterization, the equation written as follows:

$$\rho_i = x \cos \theta_i + y \sin \theta_i$$

For a line with parameters $(\rho,\theta)$ in an image plane, all the points that go through the line obey the above equation. As a result, for the candidate image points, the Hough transform algorithm determines which lines can be extracted and which lines can be eliminated.

In block 24, a false alarm mitigation analysis test is applied for verifying that the identified lane marker as extracted by the Hough technique is a lane marker. To execute the false alarm mitigation analysis test, a length (l) of each identified lane marker is determined in the world coordinates through camera calibration with respect to the ground plane. Next, the length (l) of each identified lane marker is compared to a predetermined length. The predetermined length is representative of a minimum length that a respective lane marker must be in order to be considered a lane marker. If the length (l) is greater than the predetermined length, then the identified lane marker is considered to be a lane marker. If the length (l) is less than the predetermined length, then the identified lane marker is considered not to be the lane marker.

Figure 8:
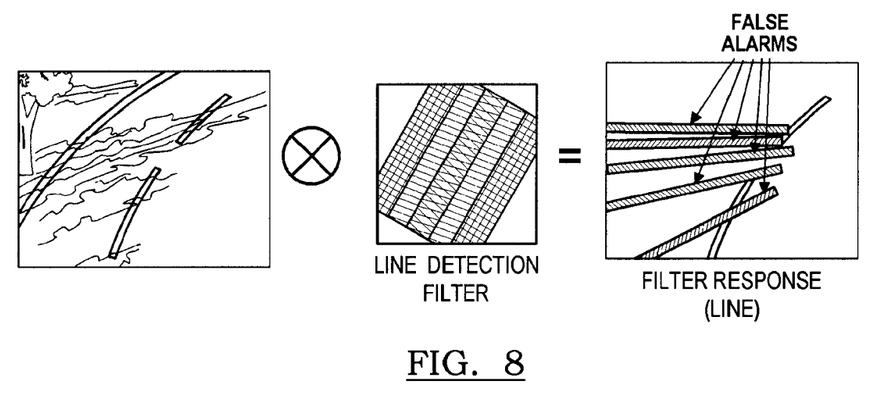
FIG. 8 is an image representation of a false alarm mitigation process.

A second false mitigation analysis test may be applied in addition to or as an alternative to the false alarm mitigation analysis test described above as shown in FIG. 8. A distance is determined between a first identified lane marker and a second identified lane marker parallel to the first identified lane marker in the world coordinates through camera calibration with respect to the ground plane. The distance is compared to a predetermined width. The width is representative of at least the minimal width of a lane of a road. A determination is then made whether the first and second identified lane markers are lane markers in response to the width being less than the predetermined width. If the width between the first and second identified lane markers is less than the predetermined width, then the determination is made that the first and second identified lane markers are not lane markers, or at least one of the respective identified lane markers is not a lane marker. This respective false alarm mitigation test assists in distinguishing shadows from lane markers resulting from trees and other objects casting shadows on the road.

Figure 9:
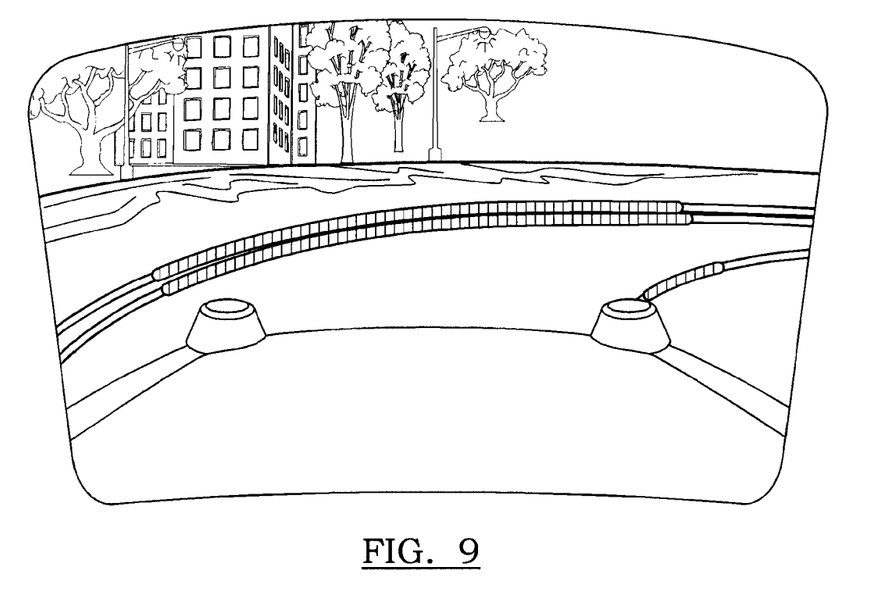
FIG. 9 is a display of highlighted lane markers in the captured image.

In block 25, lane marker detection is applied to the output device as shown in FIG. 9. The output device as described earlier may include, but is not limited to, an autonomous steering module or an imaging display device. An autonomous steering module uses the detected lane markers for autonomously maintaining the vehicle position between detected lane markers. An imaging display device highlights the detected lane markers for visually enhancing the vehicle lane to the driver of the vehicle as shown in FIG. 9. As stated earlier, highlighting refers to identifying the location of either the lane markers or road segment in the image data and may be performed by any comparable method for showing the location of the lane markers or road segment in the image data.

Figure 10:
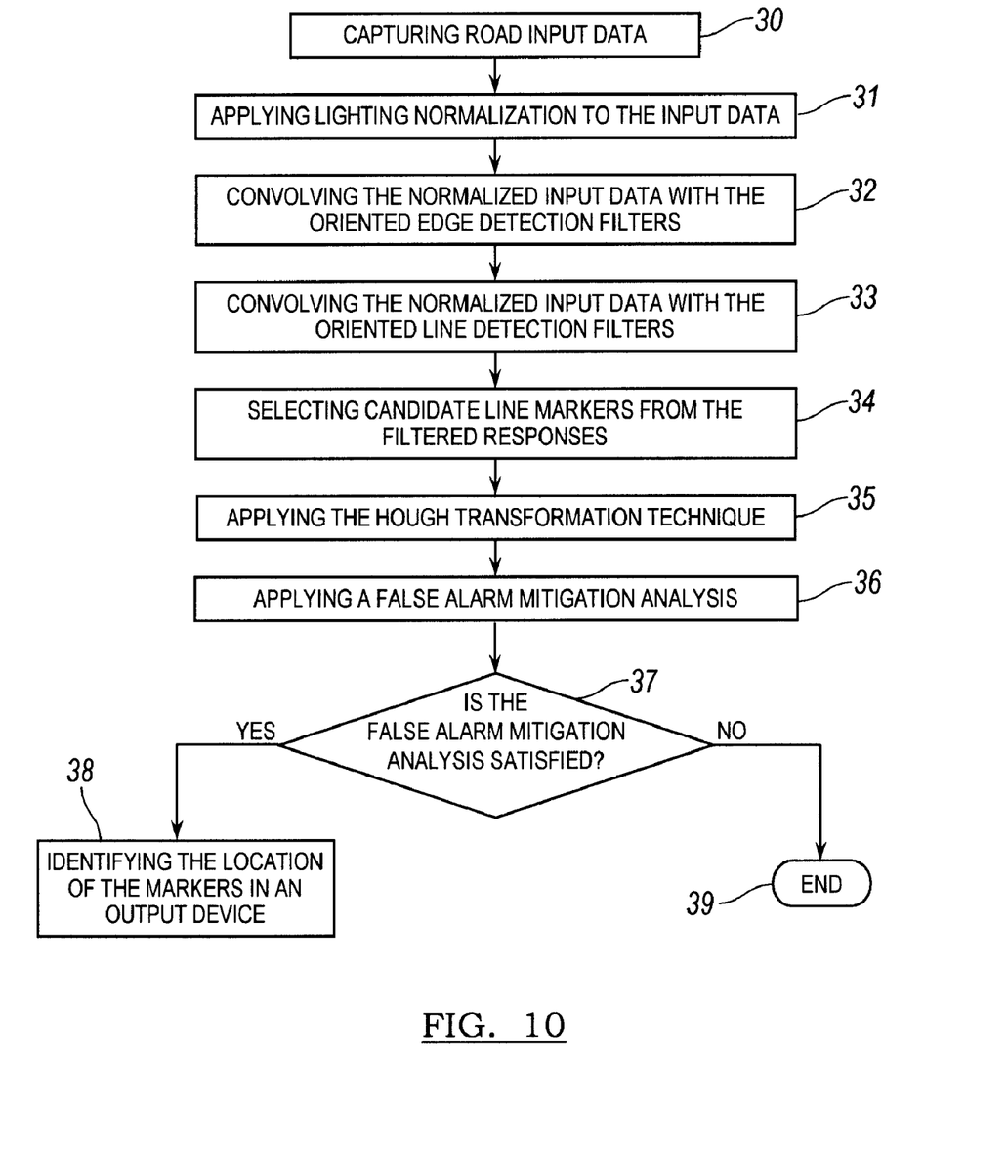
FIG. 10 is a flowchart of a method for detecting lane markers in the road.

FIG. 10 is a flowchart of a method for detecting a lane marker. In step 30, road input data is captured by an imaging device that includes, but is not limited to, a camera. In step 31, lighting normalization is applied to the captured input data.

For each main orientation angle $\alpha$, in step 32, the normalized input image is convolved with the oriented edge detection filter for detecting the edge responses of lane markers with orientation close to the angle $\alpha$ captured in the input image. In step 33, the normalized lighting input data is convolved with the oriented line detection filter for detecting the line responses of lane markers with orientation close to the angle $\alpha$ captured in the input image. The filtering using the oriented edge and line detection filters are performed simultaneously.

In step 34, candidate lane markers are detected from the filter responses. The candidate lane markers are detected from the cooperative filtering of the line of the lane markers and the edges of the lane markers. For each main orientation angle $\alpha$, the oriented edge detection filter and line detection filter with an angle $\alpha$ are used to obtain candidate points that are on the desired line with the angle close to $\alpha$. The selected candidate points have large positive line filter responses greater than a pre-determined threshold, and large positive edge filter responses greater than a pre-determined threshold and large negative edge filter responses less than a negative pre-determined threshold along the perpendicular direction of $\alpha$ at a pre-determined distance (e.g. a few pixels) in the normalized image. In step 35, a Hough transform technique is applied to the candidate lane markers detected in the line-based filter response and the edge-based filter responses. The Hough transform technique extracts the identified lane markers and eliminates any outliers in the filter responses.

In step 36, a false alarm mitigation analysis is applied to the identified lane markers extracted from the Hough transform technique. In step 37, a determination is made whether a false alarm mitigation analysis is satisfied. If the false alarm mitigation analysis is satisfied, then the location of the lane markers is identified in an output device in step 38.

In step 37, if the determination is made that the false alarm mitigation analysis is not satisfied, then a determination is made that the identified lane markers or at least one of the identified lane markers are not lane markers and the routine proceeds to step 39 where the routine ends.

Figure 11:
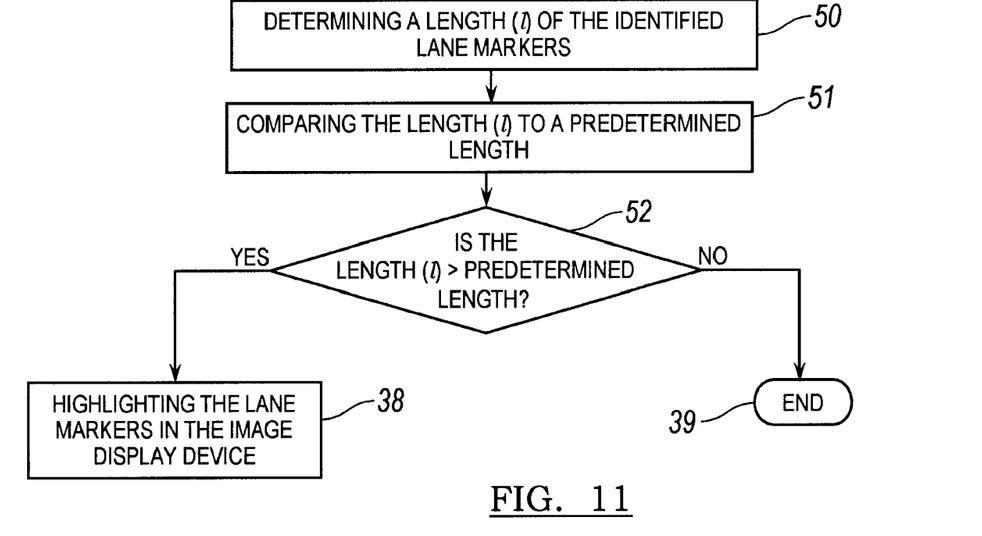
FIG. 11 is a flowchart of a method for a false alarm mitigation analysis according to a first embodiment.

FIG. 11 illustrates an embodiment of a method of a false alarm mitigation analysis performed for determining whether the identified lane marker was correctly identified as the lane marker.

In step 40, a length (l) of each identified lane marker is determined in the world coordinates through camera calibration with respect to the ground plane. In step 41, the determined length (l) width is compared to a predetermined length. In step 42, a determination is made whether the length (l) is greater than the predetermined length. If the length (l) is smaller than the predetermined length, then the routine proceeds to step 39 where the routine is terminated. If the length (l) is greater than the predetermined distance, then the routine proceeds to step 38.

In step 38, lane markers of the road are highlighted in the output device such as an image display device for visually enhancing the location of the lane marker to the driver of the vehicle. Alternatively, the location of the lane markers may be provided to an output device such as an autonomous steering module for autonomously maintaining the vehicle position between the lane markers.

Figure 12:
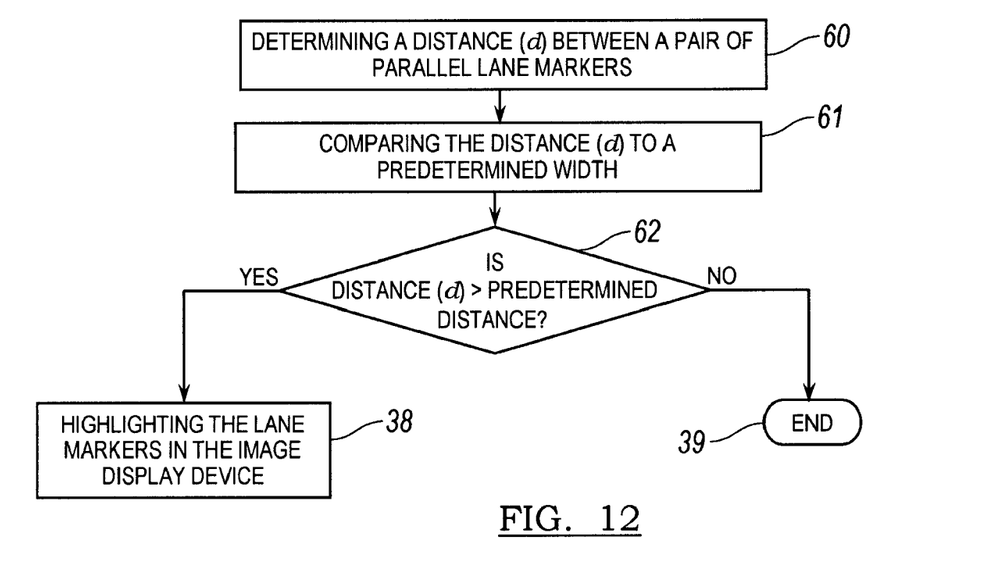
FIG. 12 is a flowchart of a method for a false alarm mitigation analysis according to a second embodiment.

FIG. 12 illustrates an embodiment of a method of a false alarm mitigation analysis performed for determining whether the identified lane marker was correctly identified as the lane marker. The embodiment as shown in FIG. 12 may be a second false alarm mitigation analysis that is performed in addition to the analysis shown in FIG. 10, or may be performed as an alternative analysis to the analysis shown in FIG. 10.

In step 50, a distance (d) is determined between a pair of parallel lane markers in the world coordinates through camera calibration with respect to the ground plane. In step 51, a comparison is made as to whether the distance (d) is greater than a predetermined distance. In step 52, a determination is made whether the distance (d) is greater than the predetermined distance. If distance (d) is less than the predetermined distance, then the routine proceeds to step 39 where the routine is terminated. If the distance (d) is greater than the predetermined distance, then, then the routine proceeds to step 38.

In step 38, lane markers of the road are highlighted in the image display device of visually enhancing the location of the lane marker to the driver of the vehicle. Alternatively, the location of the lane markers may be provided to an autonomous steering module for autonomously maintaining the vehicle position between the lane markers.

While certain embodiments of the present invention have been described in detail, those familiar with the art to which this invention relates will recognize various alternative designs and embodiments for practicing the invention as defined by the following claims.

What is claimed is:

1. A method of detecting road lane markers in a vehicle road using an imaging device, the method comprising the steps of:

capturing road input data using the imaging device;

applying lighting normalization to the road input data;

convolving the normalized input data with an edge detection filter for generating an edge-based filter response;
convolving the normalized input data with a line detection filter for generating a line-based filter response;
selecting candidate lane markers in response to the edge-based filter response and line-based filter response; and
applying a transformation technique to the candidate lane markers for identifying the lane markings.

2. The method of claim 1 further comprising the step of applying a false alarm mitigation analysis for verifying whether the identified lane marker is a lane marker, wherein the false alarm mitigation analysis comprises the steps of:
determining a length of the identified lane markers;
comparing the length to a predetermined length; and
determining that the identified lane markers are the lane markers in response to the length being greater than the predetermined length, otherwise determining that the identified lane markers are not the lane marker.

3. The method of claim 1 further comprising the step of applying a false alarm mitigation analysis for verifying whether the identified lane marker is a lane marker, wherein the false alarm mitigation analysis comprises the steps of:
determining a distance between a first identified lane marker and a second identified lane marker;
comparing the distance to a predetermined width, the predetermined width being representative of at least the width of a lane of a road; and
determining that the first lane marker and the second lane marker are lane markers in response to the width being less than the predetermined width, otherwise determining that the first lane marker and second lane marker are not lane markers.

4. The method of claim 3 wherein the first lane marker and the second lane marker must be parallel to one another.

5. The method of claim 1 wherein the imaging device comprises a camera.

6. The method of claim 1 wherein the processing the captured data for identifying the lane markers is performed in real time.

7. The method of claim 1 wherein the captured road input data is segmented into a plurality of straight lines oriented at different angles representing curvatures of potential lane markers in the vehicle road.

8. The method of claim 7 wherein the edge detection filter includes a plurality of oriented edge-based filters, wherein each oriented edge-based filter is applied to each segmented straight line.

9. The method of claim 8 wherein applying each oriented edge-based filter to each respective segmented straight line is performed substantially simultaneously.

10. The method of claim 7 wherein the edge detection filter outputs an enhanced edge-based filter response on each side of the candidate lane marker.

11. The method of claim 10 wherein the enhanced edge-based filter response includes a first edge and a second edge of the candidate lane marker, the first edge is identified by a negative peak in the edge-based filter response and the second edge is identified by a positive peak in the edge-based filter response.

12. The method of claim 1 wherein the line detection filter includes a plurality of oriented line-based filters, wherein each oriented line-based filter is applied to each respective segmented straight line.

13. The method of claim 12 wherein the processing of the filter responses for each oriented line-based filter is performed substantially simultaneously.

14. The method of claim 12 wherein the edge-based filter response includes a positive line response, and the positive line response is identified by only a single positive peak.

15. The method of claim 1 further comprising the step of identifying a location of each of the lane markers in an output device, wherein the output device includes an image display device.

16. The method of claim 1 further comprising the step of identifying a location of each of the lane markers in an output device, wherein the output device includes an autonomous steering module.

17. A lane marker detection system comprising:
an imaging device for capturing road input data;
a processor for receiving the captured road input data received by the imaging device, the processor applying lighting normalization to the road input data, the processor convolving the normalized input data with an oriented edge detection filter for generating an edge-based filter response, the processor convolving the normalized input data with an oriented line detection filter for generating a line-based filter response, the processor applying a transformation technique to the edge-based filter response and the lane-based filter response for identifying the lane markings; and
an output device for identifying a location of each of the lane markers.

18. The lane marker detection system of claim 17 further comprising a false alarm mitigation module for verifying whether the identified lane marker resulting from the applied transformation technique is a lane marker.

19. The lane marker detection system of claim 18 wherein the imaging device is a camera.

20. The lane marker detection system of claim 17 wherein the transformation technique includes Hough transformation technique.

* * * * *